United States Patent
Maurer

(10) Patent No.: US 11,260,486 B2
(45) Date of Patent: Mar. 1, 2022

(54) CLAMPING FIXTURE, IN PARTICULAR A VICE

(71) Applicant: SMW-Autoblok Spannsysteme GmbH, Meckenbeuren (DE)

(72) Inventor: Eckhard Maurer, Oberteuringen (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 79 days.

(21) Appl. No.: 15/651,298

(22) Filed: Jul. 17, 2017

(65) Prior Publication Data
US 2018/0029181 A1 Feb. 1, 2018

(30) Foreign Application Priority Data
Aug. 1, 2016 (EP) .................................. 16182221

(51) Int. Cl.
| | |
|---|---|
| B23Q 3/06 | (2006.01) |
| B25B 1/02 | (2006.01) |
| B25B 1/24 | (2006.01) |
| B25B 1/08 | (2006.01) |
| B23Q 3/10 | (2006.01) |
| F16J 15/10 | (2006.01) |

(52) U.S. Cl.
CPC .............. *B23Q 3/066* (2013.01); *B23Q 3/10* (2013.01); *B25B 1/02* (2013.01); *B25B 1/08* (2013.01); *B25B 1/24* (2013.01); *F16J 15/102* (2013.01)

(58) Field of Classification Search
CPC .. B23Q 3/066; B23Q 3/10; B25B 1/02; B25B 1/08; B25B 1/24; F16J 15/102
See application file for complete search history.

(56) References Cited

U.S. PATENT DOCUMENTS

| | | | | |
|---|---|---|---|---|
| 4,963,038 A | * | 10/1990 | Asano ................ | B23Q 11/0875 384/15 |
| 5,149,204 A | * | 9/1992 | Tennichi ............. | F16C 29/0642 384/15 |
| 5,149,205 A | * | 9/1992 | Tsukada .............. | F16C 29/0633 384/15 |
| 5,492,413 A | * | 2/1996 | Tsukada .............. | F16C 33/6622 384/15 |
| 5,634,722 A | * | 6/1997 | Yuasa ................. | F16C 29/0645 384/15 |

(Continued)

FOREIGN PATENT DOCUMENTS

| | | |
|---|---|---|
| DE | 1121559 | 1/1962 |
| EP | 0528286 | 2/1993 |

(Continued)

*Primary Examiner* — Joel D Crandall
(74) *Attorney, Agent, or Firm* — Pandiscio & Pandiscio

(57) ABSTRACT

In a clamping fixture 1, in particular a vice, with a housing (2) in which a guide track (10) is provided and with at least one base jaw (3, 4) to each of which a clamping jaw (6, 7) can be attached, the cavities or air gaps (21) between the inner wall of the guide grooves (10) and the base jaws (3, 4) should be completely covered.

This is achieved in that a seal (11) is inserted into each of the air gaps (21) existing in the housing 2 between the base jaw (3, 4) and the inner wall of the guide track (10) as well as in the parting plane between the base jaws (6, 4) and at the face ends (16) in the area of the guide track (10) running there, and that the particular seal (11) is held in a specified position by means of a support strip (12).

6 Claims, 6 Drawing Sheets

(56) References Cited

U.S. PATENT DOCUMENTS

| | | | | |
|---|---|---|---|---|
| 5,769,543 | A * | 6/1998 | Tsukada | F16C 29/0609 |
| | | | | 384/13 |
| 5,772,333 | A * | 6/1998 | Yabe | F16C 29/086 |
| | | | | 384/13 |
| 6,241,230 | B1 * | 6/2001 | Kawaguchi | B08B 15/00 |
| | | | | 269/285 |
| 6,257,766 | B1 * | 7/2001 | Agari | F16C 29/0609 |
| | | | | 384/15 |
| 6,296,413 | B1 * | 10/2001 | McCann | B23Q 11/0816 |
| | | | | 384/15 |
| 7,374,339 | B2 * | 5/2008 | Mochizuki | F16C 29/088 |
| | | | | 384/15 |
| 2003/0189349 | A1 * | 10/2003 | Risle | B25J 15/0253 |
| | | | | 294/207 |
| 2010/0052348 | A1 * | 3/2010 | Williams | B25J 15/028 |
| | | | | 294/119.1 |
| 2018/0085929 | A1 * | 3/2018 | Zimmer | B25J 15/0028 |

FOREIGN PATENT DOCUMENTS

| | | |
|---|---|---|
| EP | 2335878 | 6/2011 |
| EP | 2842670 | 3/2015 |
| JP | H0425028 | 2/1992 |
| JP | 201014482 | 7/2010 |
| WO | WO 2015/085987 | 6/2015 |

\* cited by examiner

CLAMPING FIXTURE, IN PARTICULAR A VICE

REFERENCE TO PENDING PRIOR PATENT APPLICATION

This patent application claims benefit of European Patent Application No. 16 182 221.8, filed Aug. 1, 2016, which patent application is hereby incorporated herein by reference.

FIELD OF THE INVENTION

The present invention relates to a clamping fixture, in particular a vice, in accordance with the pre-characterising clause of Patent claim 1.

BACKGROUND OF THE INVENTION

Clamping fixtures of this kind are chiefly used for clamping workpieces in the most accurate possible position in the area of a machine tool. The machine tool then machines the workpiece that is held in a fixed position, for example by milling, drilling, etc.

Clamping fixtures of this kind normally consist of two base jaws that are mounted in an axially movable arrangement in a guide track worked into a housing, and which can be moved towards one another or away from one another by a spindle drive. In this case, the base jaws are positioned flush with the upper end face of the housing, meaning that a flat surface is created. A clamping jaw can be attached to each of the base jaws and is configured according to the geometry and size of the workpiece to be clamped. As soon as the base jaws are actuated in this arrangement, they and also the clamping jaws move in the direction of the workpiece or away from it. By means of the force of the spindle drive, the intended clamping force that is applied by the clamping jaws to the workpiece can be adjusted.

Clamping fixtures of this kind have proven sufficiently effective in practice over decades and are available in an extremely wide range of design embodiments. During machining of the workpiece, chips and other contamination are generated. Moreover, coolants or lubricants are often used and are required for the machining of the workpiece. Liquid and solid extraneous materials can get into the intermediate cavities or air gaps, for example between the base jaw and the inner wall of the guide groove. These liquid and solid extraneous materials impair the sliding properties of the base jaw along the guide groove, however, with the effect that the clamping force is reduced, for example, or the base jaw can even be blocked in the guide track.

SUMMARY OF THE INVENTION

It is thus the task of the present invention to develop a clamping fixture, in particular a vice, of the aforementioned kind in such a way that the existing cavities or air gaps between the inner wall of the guide track and the base jaw are completely sealed so as to prevent penetration by extraneous particles, especially lubricants, chips and the like, with the effect that the sliding properties of the base jaw along the guide track are retained over the longest possible operating period.

In accordance with the present invention, these tasks are accomplished by the features of the characterising part of Patent Claim 1.

Other advantageous further embodiments of the present invention are derived from the subordinate claims.

As a result of seals being inserted in the air gaps in the housing between the base jaw and the inner wall of the guide track as well as in the parting plane between the base jaws and on the end cases in the area of the guide track running in that area, and that each of the seals in question is held in a specified position by means of a support strip, a situation is achieved in which the extraneous materials generated during machining, in particular chips and coolant, cannot penetrate the inside of the housing. As a result, the base jaw can be moved along the guide track with a constant level of sliding friction and other damage caused by the extraneous substances or chips is avoided.

The housing seal is achieved with the help of a two-part body comprising an elastic seal made of rubber, plastic or a rubber/plastic blend, for example, especially a PU foam and of a hard, flexurally rigid support strip, in particular made of a metallic material, which firstly creates a reliable seal and secondly the seal provides protection over a lengthy operating period, even against external forces.

In an advantageous embodiment, the support strip can be locked on the outside or face ends of the housing by means of fastening screws or clamping wedges, with the effect that it is connected to the housing in a removable arrangement. If the seal becomes porous after a particular operating period, it can be exchanged without further ado. Moreover, the base jaws can be changed without difficulties if they need to be replaced.

BRIEF DESCRIPTION OF THE DRAWINGS

The drawing shows a sample embodiment of a clamping fixture configured in accordance with the present invention, the details of which are explained below. In the drawing.

DETAILED DESCRIPTION OF THE PREFERRED EMBODIMENTS

Figure 1:
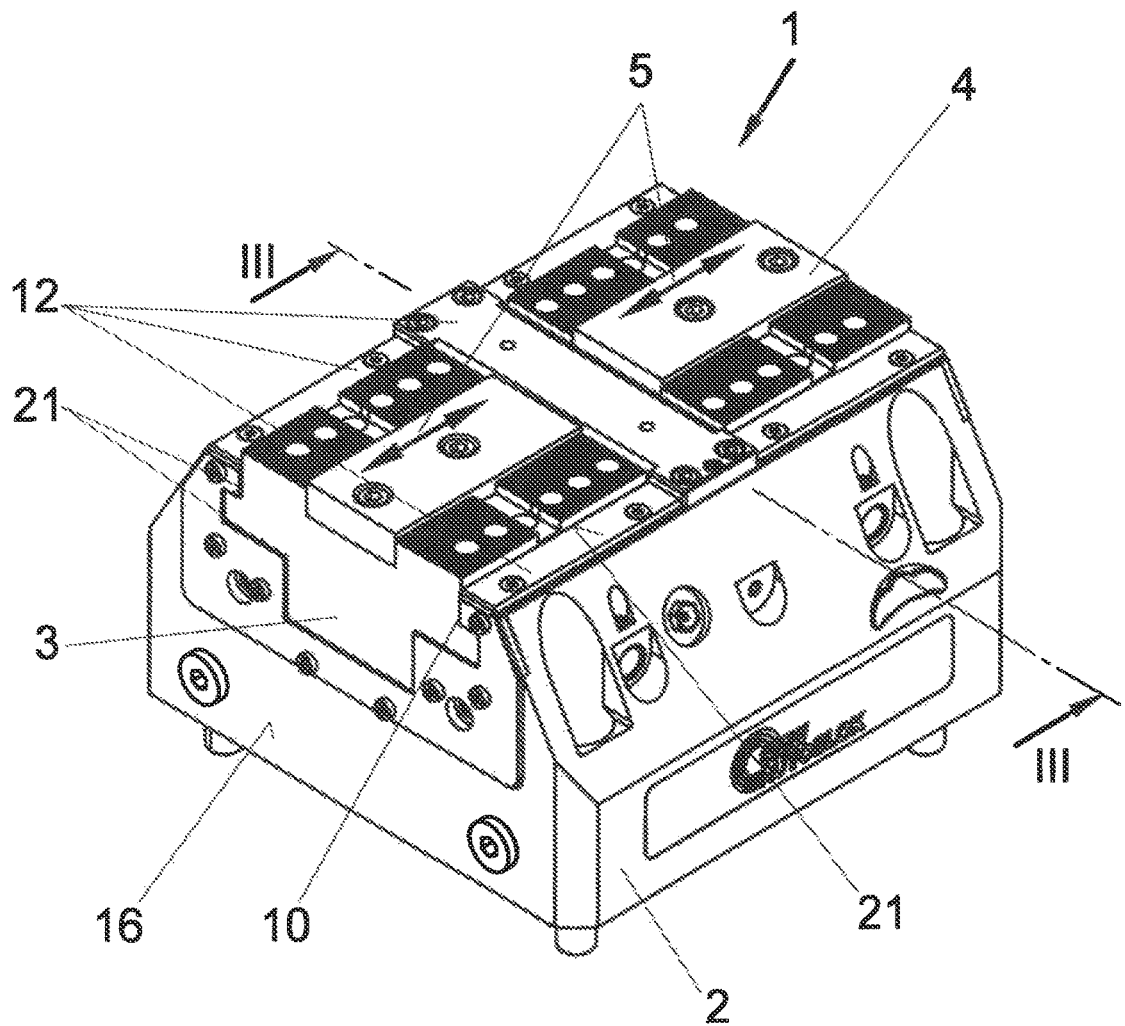
FIG. 1 shows a clamping fixture in the form of a vice with a housing in which a guide track is provided for holding two base jaws driven in an axial direction by means of a spindle drive, and with three support strips by means of which the air gap between the base jaws and the inner wall of the guide track as well as in the parting plane of the two base jaws is closed, in a perspective view.

FIG. 1 shows a clamping fixture 1 which is also designated as a vice. The clamping fixture 1 should hold a workpiece 20 in a fixed position in space, for example on a machine tool, so that the workpiece 20 can be machines.

The clamping fixture 1 consists of a housing 2 with a guide track 10 worked into it in the longitudinal direction of the housing 2, into which guide track 10 the two base jaws 2 and 4 can be inserted by pushing in at the two opposite end faces 16. The base jaws 3, 4 are coupled with a spindle drive 9 in a driving connection and can be axially moved by the spindle drive 9.

Figure 3:
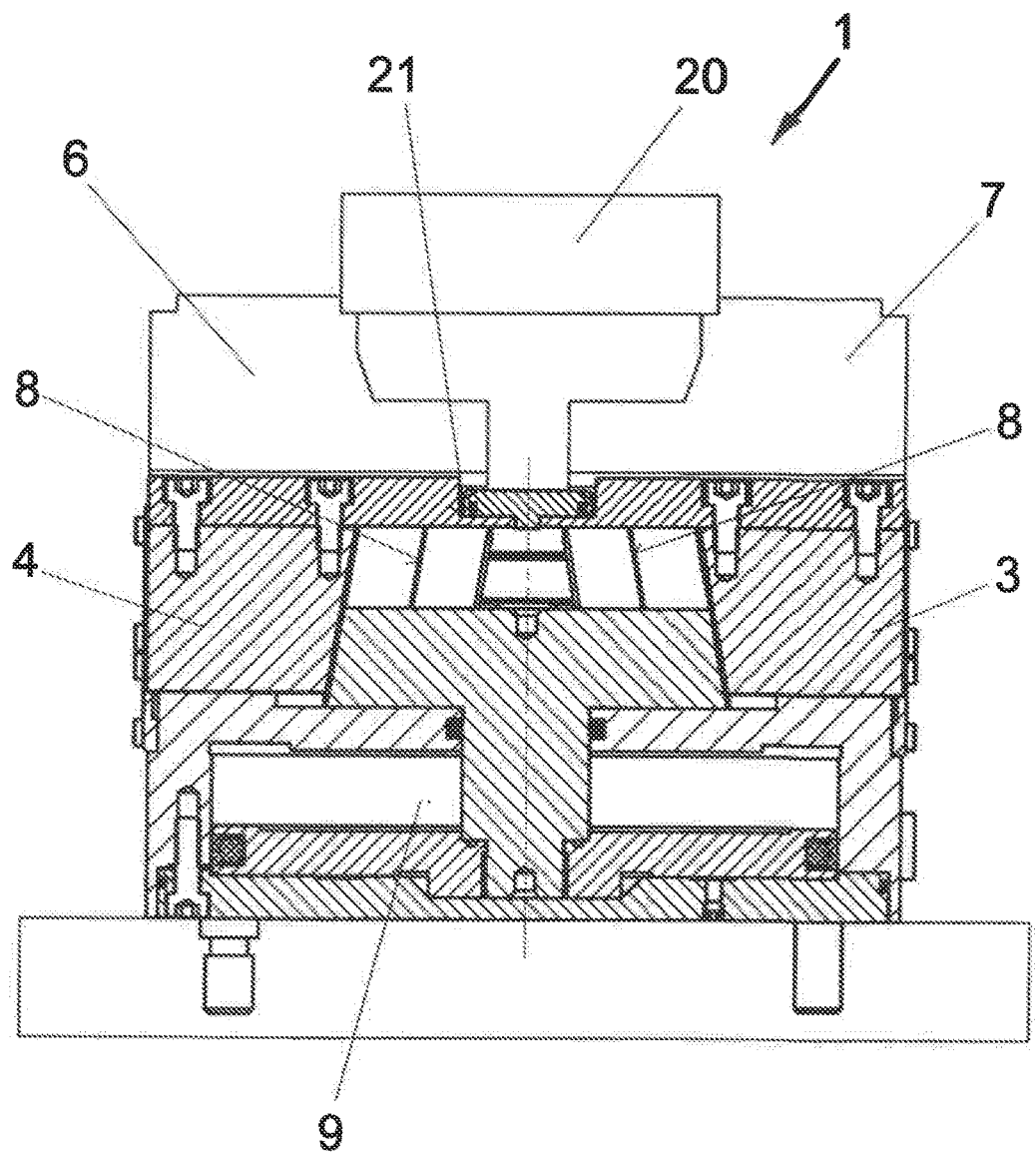
FIG. 3 shows the clamping fixture in accordance with FIG. 1 along the line III-III and with two clamping jaws attached to the relevant base jaw, by means of which a workpiece is held in a fixed position.

In particular, FIG. 3 shows that the two base jaws 3, 4 have sloping surfaces 8 that are angled towards one other and as soon as the spindle drive 9 has moved along the angled surfaces 8 the base jaws 3, 4 are either forced apart or moved together. One of the two base jaws 3 or 4 can also be configured as a fixed stop which one base jaw 3 moves towards or from which it moved away.

Figure 4A:
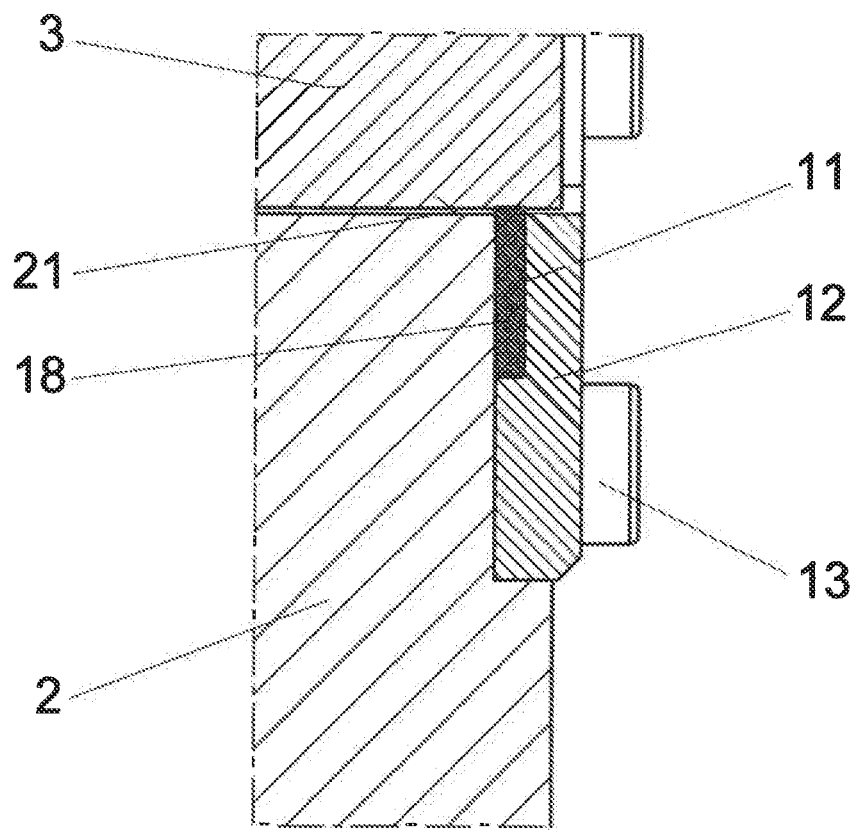
FIG. 4a shows a magnified section of the parting plane between the two base jaws in accordance with FIG. 3.
Figure 4B:
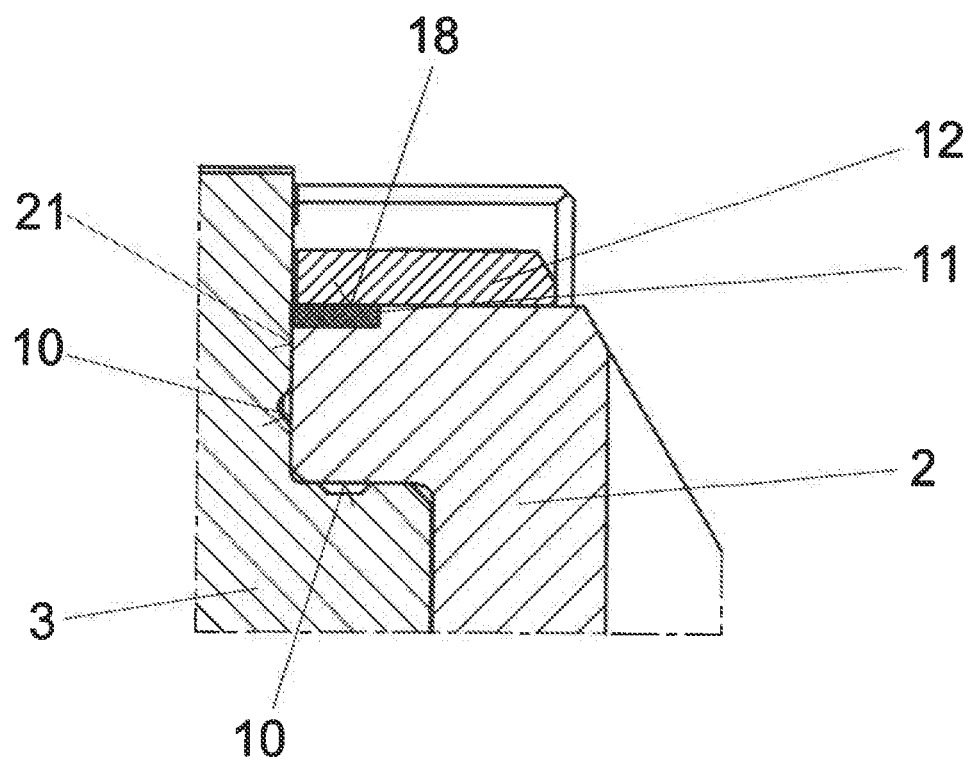
FIG. 4b shows a magnified section of the transitional area between the guide track and one of the base jaws in accordance with FIG. 3
Figure 4C:
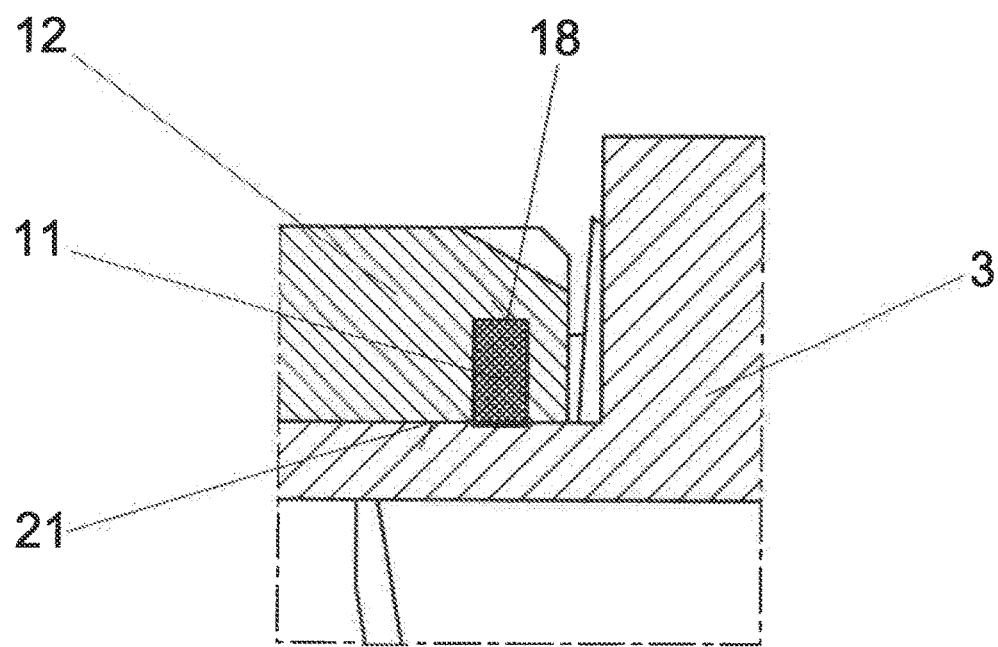
FIG. 4c shows a magnified section of the area of the face end and the guide track of the housing in accordance with FIG. 1.

The parting plane between the two base jaws 3, 4 is assigned the reference number 15. As is known, an air gap 21 is created in the corresponding transitional areas between the two base jaws 3, 4 as well as between these and the inner wall of the guide track 10, and chips or other lubricating fluids can penetrate this air gap 21, as a result of which the sliding properties of the base jaws 3, 4 along the guide track 10 are significantly impaired or may even be completely restricted. This air gap 21 should be sealed by means of a seal 11 that is made of a plastic, PU foam, rubber or a plastic/rubber blend. This can be seen in particular in FIGS. 4a, 4b and 4c. The seal 11 is made from an elastic, soft material, which means the movement of the base jaws 3,4 can cause the seal 11 to slide out of the air gap 21 in question. To prevent this, each seal 11 has a support strip 12 assigned to it which is held on the housing 2 by means of fastening screws 13 or clamping wedges 17.

Figure 2:
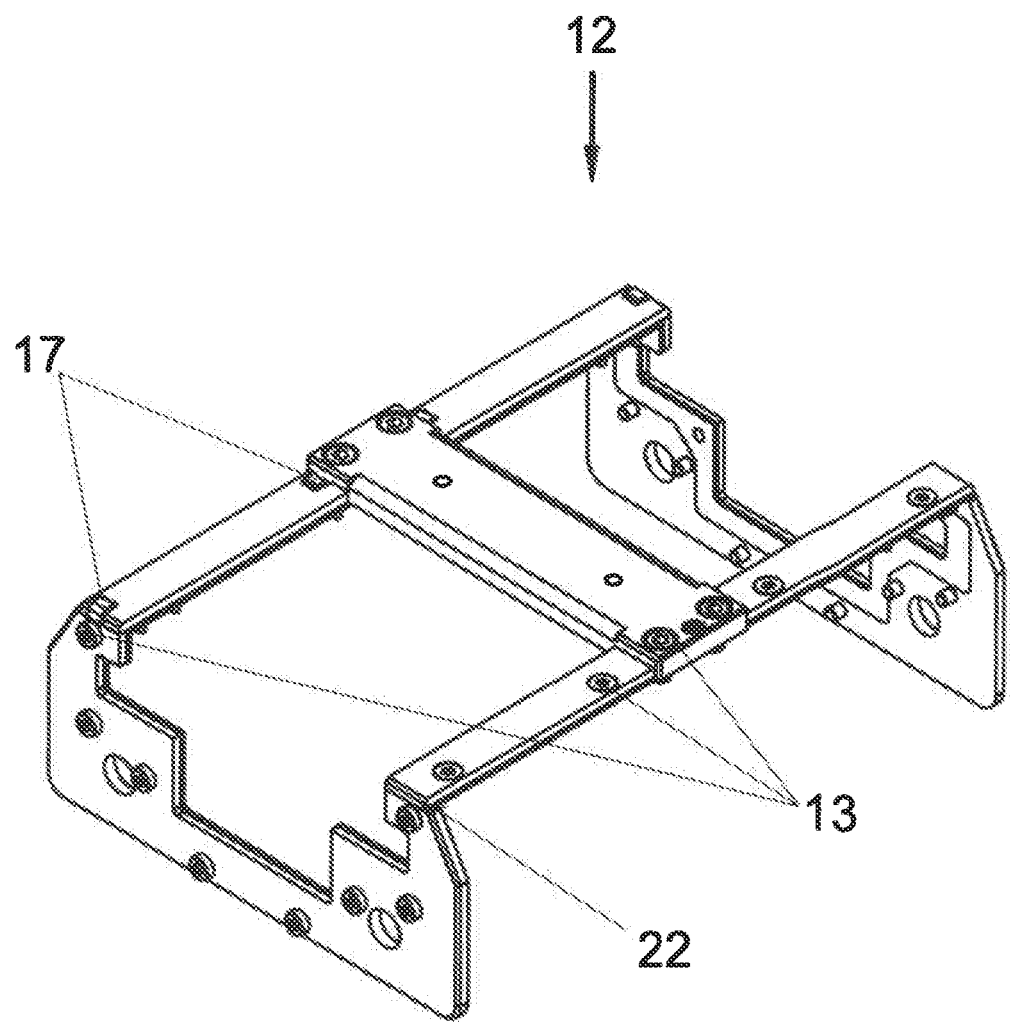
FIG. 2 shows the support strips in accordance with FIG. 1, with two additional support strips arranged in the area of the face ends of the housing, which are firmly connected to one another at their respective nodal point, in a perspective view.

FIG. 2 shows that a total of five support strips 12 are assembled into a grid structure. The support strips 12 that are adjacent in each case are screwed onto one another at the corresponding nodal points 22 and consequently form a solid structure that runs in the area of the air gap 21 between the two base jaws 3, 4 in the area of the parting plane 15 as well as between the base jaws 3, 4 and the inner wall of the guide track 10. In addition, the air gap 21 located in the area of the face ends 16 of the housing 2 should also be covered.

The seal 11 can either be connected firmly to the corresponding support strip 12, for example using a bonded or soldered joint, or the seal 11 is initially separately inserted into the corresponding air gap 21 and then the seal 11 is held in the corresponding air gap 21 by means of the support strip 12 in the corresponding position. This means the corresponding base jaw 3, 4, which according to FIG. 3 each carries a clamping jaw 7, 8, can be pushed out of the corresponding guide track without further ado, for example in order to exchange the base jaws 3, 4 or for thorough cleaning of the guide track 10.

In order to accommodate the seal 11, a U-shaped or L-shaped chamber 18 is either worked into the support strip 12 or in the housing 2, into which the corresponding seal 11 is inserted. The seal 11 is manufactured from an elastic, highly flexible material, which means the dimension of the seal 11 can be larger than the height or length of the chamber 18 which means when the support strip 12 is installed, the seal 11 is compressed between the strip 12 and the surface of the housing 2. As a result, the seal 11 is subject to a certain preload between the support strip 12 and the particular area of the housing 2.

What is claimed is:

1. A clamping fixture, the clamping fixture comprising:
   a housing comprising a guide track having a first end, a second end, and a longitudinal axis extending therebetween;
   at least one base jaw slidably disposed in the guide track such that a gap exists between the base jaw and the housing, the at least one base jaw further comprising a clamping jaw, wherein the at least one base jaw is configured to move in a clamping direction which is parallel to the longitudinal axis of the guide track;
   a seal disposed in the gap between the base jaw and the housing, the seal being disposed parallel to the longitudinal axis of the guide track; and
   a support strip, the support strip comprising a cutout sized to directly receive the seal so as to directly contact the seal and hold the seal in place between the support strip, the housing and the base jaw, such that the seal extends into the gap between the base jaw and the housing, wherein the support strip extends parallel to the longitudinal axis of the guide track.

2. The clamping fixture in accordance with claim 1, characterised in that, the support strip is attached to the housing by means of fastening screws and/or by means of clamping wedges attached to the support strip.

3. The clamping fixture in accordance with claim 1, characterised in that, the support strip comprises a metallic material and the seal comprises rubber, plastic or a rubber/plastic blend.

4. The clamping fixture in accordance with claim 1, further comprising at least two support strips, characterised in that, when the at least two support strips are mounted to the housing, the at least two support strips have a contour adapted to air gap profiles in the housing and the at least two support strips are attached to one another at one or more nodal points.

5. The clamping fixture in accordance with claim 1, characterised in that, the cutout of the support strip comprises a U-shaped or L-shaped chamber into which the seal is inserted.

6. The clamping fixture in accordance with claim 5, characterised in that, the seal is dimensioned to be larger than the corresponding U-shaped or L-shaped chamber formed in the support strip and the seal is compressed by mounting the support strip to the housing such that the seal is compressed into the U-shaped or L-shaped chamber.

* * * * *